(12) United States Patent
Cooper et al.

(10) Patent No.: US 10,688,502 B2
(45) Date of Patent: Jun. 23, 2020

(54) CONTINUOUS CENTRIFUGE

(71) Applicant: D. Cooper Works, LLC, Ephrata, PA (US)

(72) Inventors: David A Cooper, Windsor, KY (US); Doron E Cooper, Lancaster, PA (US); David N Cooper, Ephrata, PA (US); Diesha L Cooper, Ephrata, PA (US)

(*) Notice: Subject to any disclaimer, the term of this patent is extended or adjusted under 35 U.S.C. 154(b) by 69 days.

(21) Appl. No.: 16/104,839

(22) Filed: Aug. 17, 2018

(65) Prior Publication Data

US 2019/0054477 A1     Feb. 21, 2019

Related U.S. Application Data

(60) Provisional application No. 62/547,439, filed on Aug. 18, 2017.

(51) Int. Cl.

| | | |
|---|---|---|
| *B04B 3/04* | (2006.01) | |
| *B04B 5/02* | (2006.01) | |
| *B04B 11/02* | (2006.01) | |
| *B01D 33/48* | (2006.01) | |
| *B01D 33/37* | (2006.01) | |
| *B01D 33/76* | (2006.01) | |
| *B04B 15/06* | (2006.01) | |
| *B01D 33/11* | (2006.01) | |

(52) U.S. Cl.
CPC .............. *B04B 3/04* (2013.01); *B01D 33/11* (2013.01); *B01D 33/37* (2013.01); *B01D 33/48* (2013.01); *B01D 33/763* (2013.01); *B04B 5/02* (2013.01); *B04B 11/02* (2013.01); *B04B 15/06* (2013.01)

(58) Field of Classification Search
None
See application file for complete search history.

(56) References Cited

U.S. PATENT DOCUMENTS

2008/0181473 A1* 7/2008 Garty ................. C40B 60/12
                                                          382/128
2018/0318976 A1* 11/2018 Edmondson ..... C10M 175/0058

* cited by examiner

*Primary Examiner* — Chester T Barry
(74) *Attorney, Agent, or Firm* — Steve O'Donnell

(57) ABSTRACT

A two-vector centrifuge rotates on a central axis, while each centrifuge drum also rotates on the drum's own axis. The inside of each drum has flighting or threads to direct and force material to the bottom of the drum as the two-vector centrifuge rotates. Perforations in the top part of the drum allow liquids to be expelled from the drum, while dried, solid material is ejected though a gap in the bottom of the drum. A pair of troughs keep the ejected liquid fraction separate from the ejected solid fraction, and each fraction is removed from the centrifuge while the centrifuge is operating, allowing the centrifuge to run for extended periods without needing to be cleaned or have accumulated material removed.

4 Claims, 7 Drawing Sheets

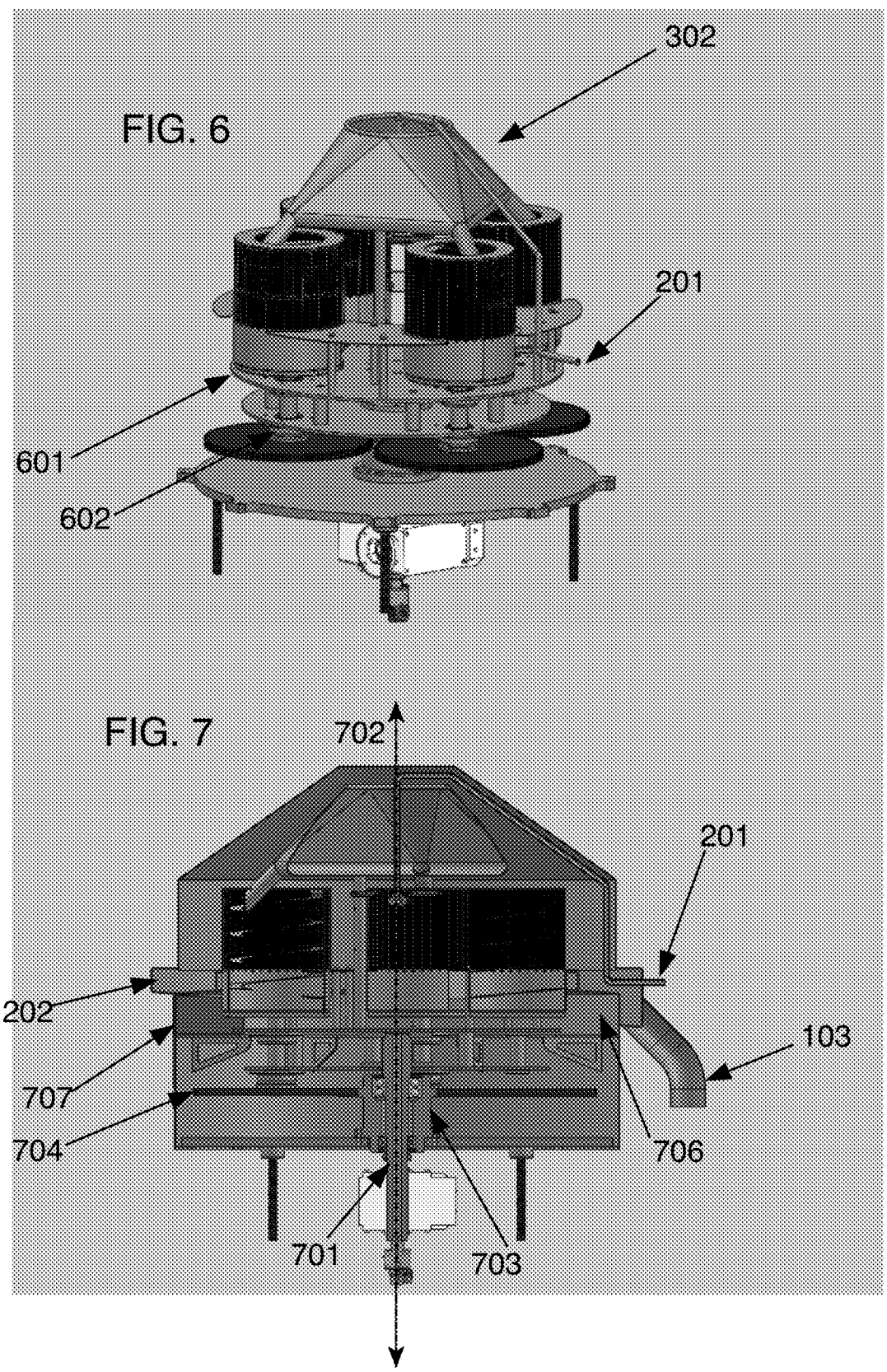

CONTINUOUS CENTRIFUGE

FIELD OF THE INVENTION

The subject matter of this application pertains to methods for and devices for separating liquids and solids. More particularly, the subject matter of this application pertains to method and devices that use centrifugal force to separate liquids from solids. Even more particularly, the subject matter of this application pertains to methods and devices which apply centrifugal force to samples of liquids and solids and which allow a constant influx of unseparated sample and constant separation and ejection of a liquid fraction and a solid fraction.

BACKGROUND

It is well known that centrifuges can be used to separate mixtures consisting of liquids of different densities and mixtures consisting of liquids and solids. Although there are a number of different designs for different applications, generally a centrifuge has at least one well that rotates about a central point. The well is held at a fixed diameter from the center and centripetal force prevents it flying off tangentially from its circular path. More commonly, when describing what a centrifuge does, people refer to the apparent centrifugal force which seems to push the well and its contents out from the central point when viewed in a rotating frame of reference.

This radial acceleration results in the more dense fraction settling at the point of the well most distal from the central point, and less dense fraction being located proximal to the central point. The acceleration rate and the duration of acceleration can determine what materials settle to the distal point. For example, a certain radial acceleration and duration will separate platelets from plasma, while another will separate cream from milk, and multiple-step centrifugation can separate DNA from lysed cells.

Among other uses, animal processors may use a centrifuge to separate water from solid materials, separate fats, collect gelatin, or to clean waste water.

The amount of material that can be processed in a centrifuge per unit of time is determined, in part, by the materials being separated, the radial acceleration rate, and the volume of the centrifuge wells. For most industrial applications, the materials being separated will be consistent and the radial acceleration rate will have been optimized for it. The volume of the wells is then of great importance. In use, the mixed materials are placed in the well and spun at the appropriate rate and time to achieve the desired separation. The centrifuge then spins down to a stop, the top fraction on top is poured off (or collected if needed), and the material at the bottom is removed. In animal processing and other applications in which the centrifuge is used to separate liquids from solids, some centrifuge designs decrease the need to stop the machine for material removal by using a liquid-material removal means such as pores in the well, tipping methods, or an aspiration means. Such liquid-material removal means allow the the addition of new mixed material while the centrifuge is spinning; and since the liquid material is removed during rotation, the centrifuge doesn't need to be stopped until the well is sufficiently full of the more dense material. However, when the well is full, the centrifuge needs to be brought to a stop and each well needs to be emptied before it can be started again.

SUMMARY

The primary objective of the subject matter of this application is to provide a method and device for separating liquids and solids. A further objective is to provide a continuous flow centrifuge that does not need to be stopped for removal of the liquid or solid fractions. More precisely, an objective of the disclosed device and method is to use the centrifugal pseudo-force to separate liquid from animal tissue, and separately eject the liquid and solid fraction from the rotating drum.

The subject matter of this application satisfies these objectives. The disclosed continuous centrifuge is comprised of a number of drums. Each drum rotates on its axis while also rotating around a central axis, much like a planet rotates on its axis while also rotating around a star. The inside of each drum has auger fighting and the combination of the two rotation vectors and the fighting keeps the material in the drum moving towards the bottom. Perforations in the drum allow liquid to escape while the solid material moves towards an opening near the bottom of the drum where it is ejected and collected. Periodic targeted blasts of air against the drums prevent solid material from sticking to the drum and blocking the passage of water through the perforations.

BRIEF DESCRIPTION OF THE DRAWINGS

FIG. 6 is a view of the continuous centrifuge removed from the outer housing.

FIG. 7 is a mid-coronal section of the closed continuous centrifuge.

DETAILED DESCRIPTION OF THE DRAWINGS

Figure 1:
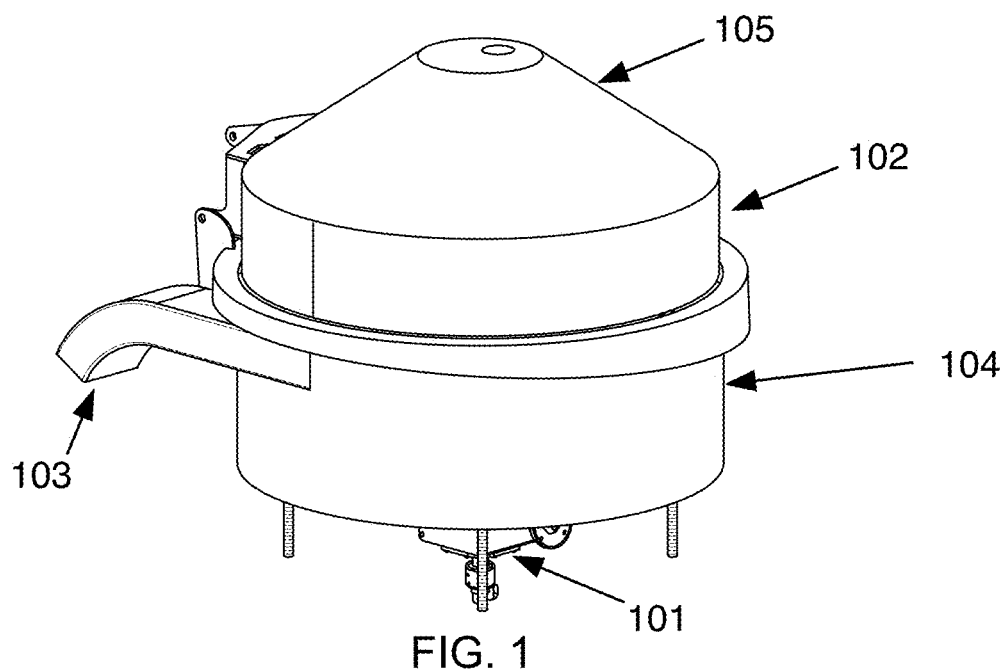
FIG. 1 is a view of the perspective view of the closed continuous centrifuge.
Figure 2:
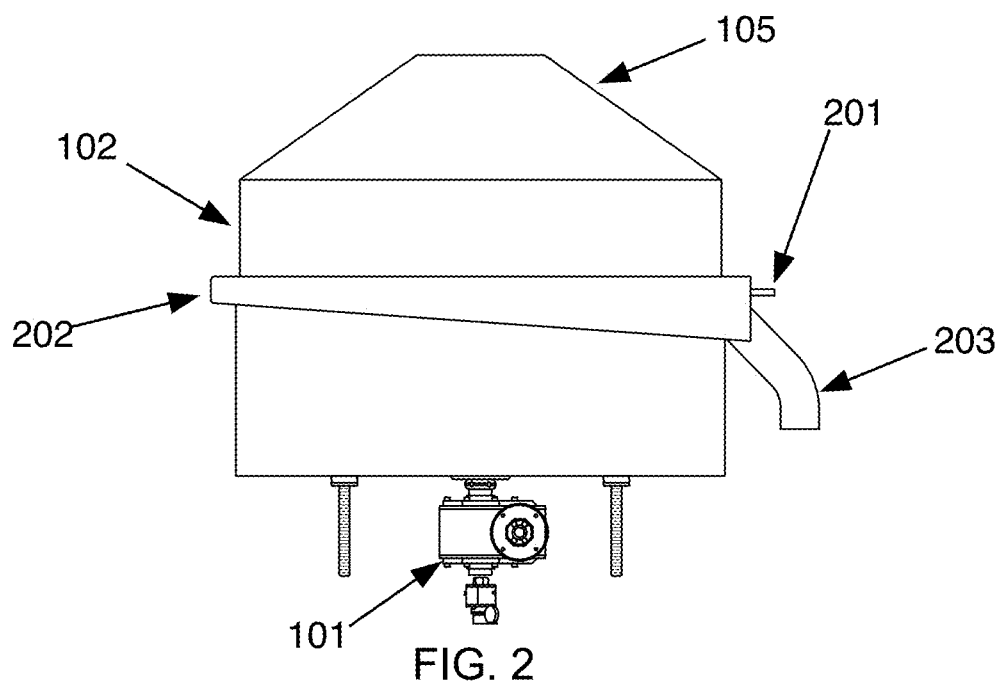
FIG. 2 is a side elevation of the closed continuous centrifuge.
Figure 3:
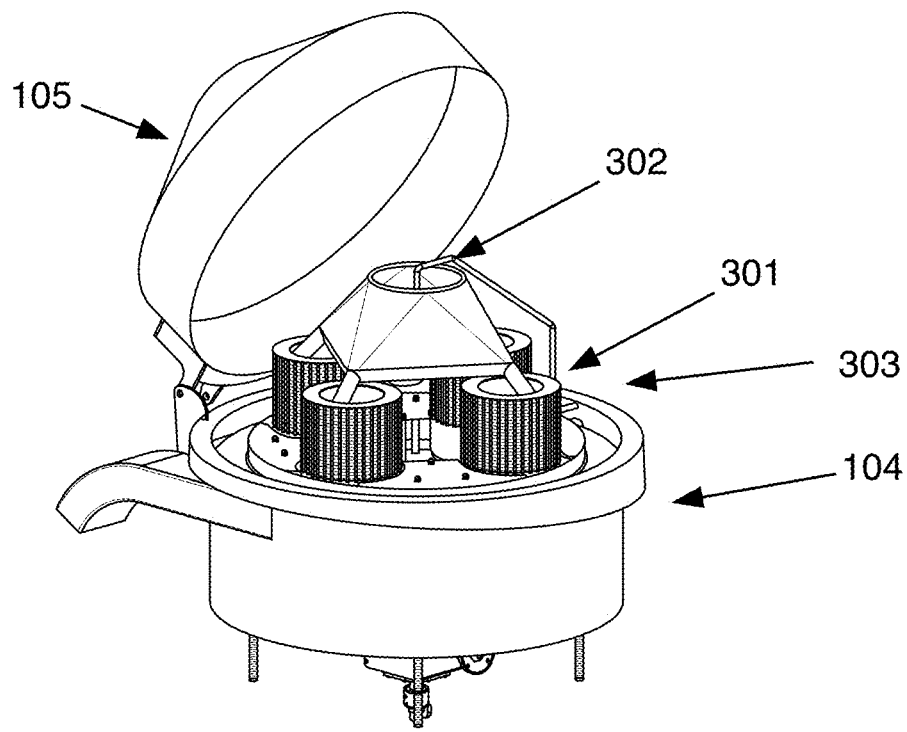
FIG. 3 is a view of the of the continuous centrifuge with its lid opened.
Figure 4:
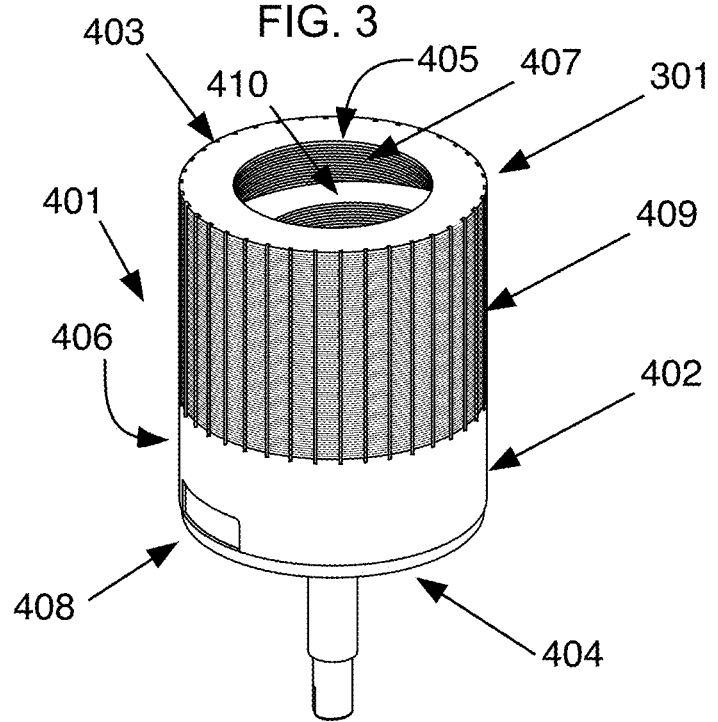
FIG. 4 is a view of a centrifuge drum.
Figure 5:
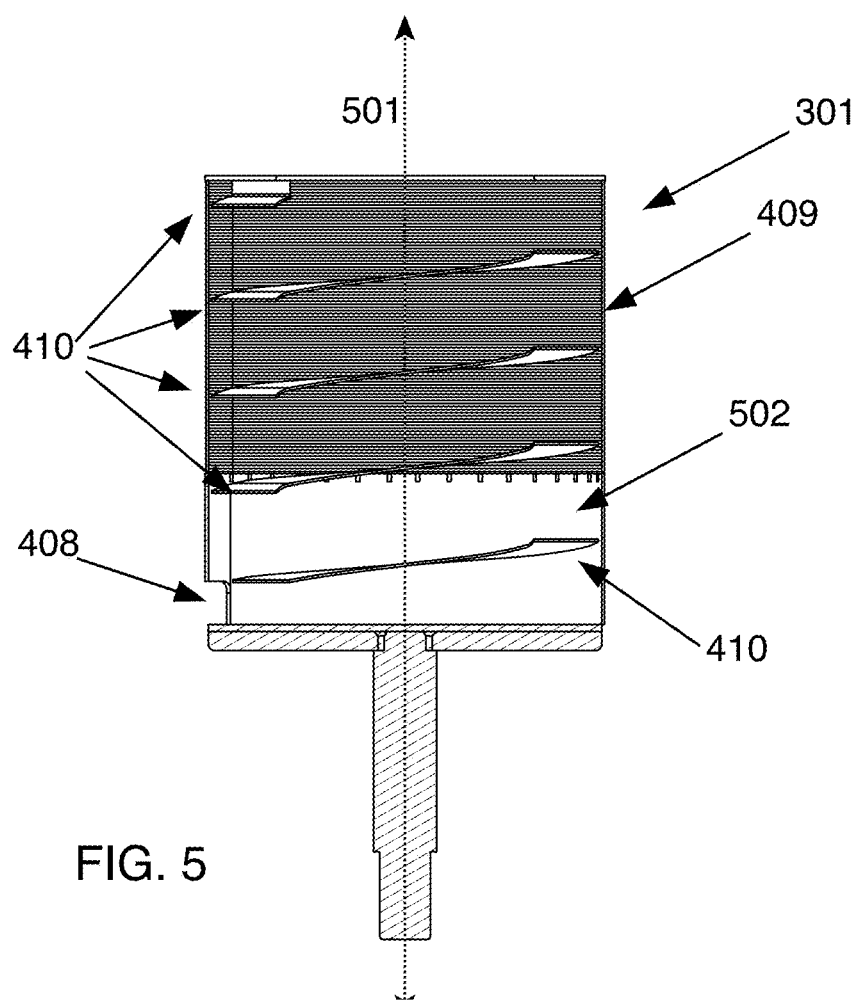
FIG. 5 is a mid coronal section of a centrifuge drum.
Figure 8:
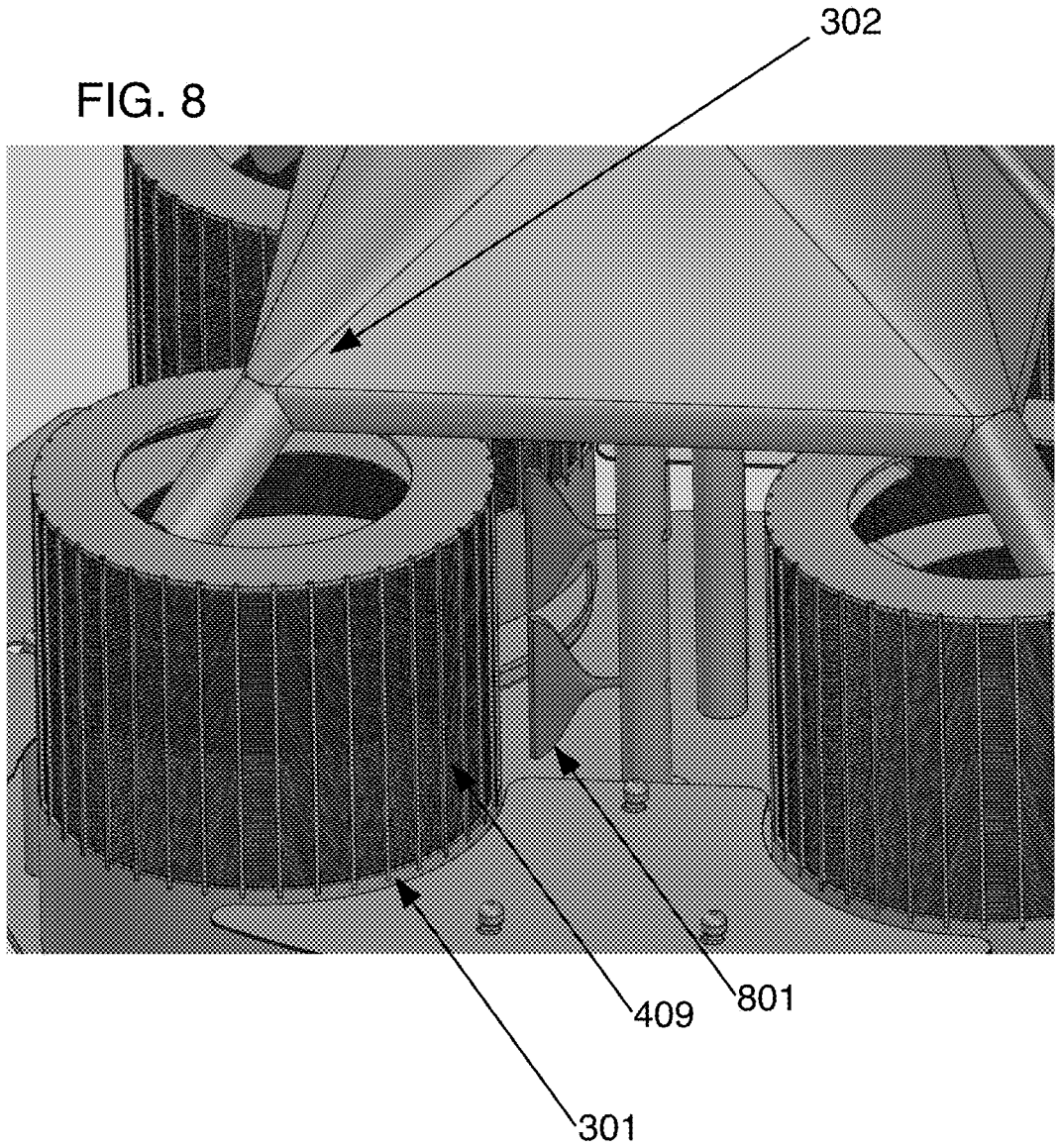
FIG. 8 is a view showing showing air jets and a drum.
Figure 9:
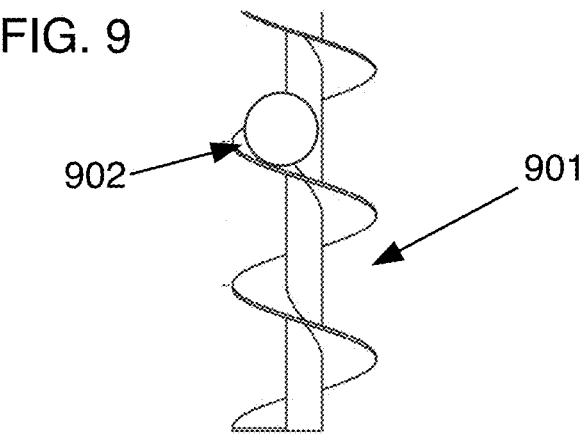
FIG. 9 is a example of left-handed auger flighting as may be present in an embodiment of the disclosed centrifuge.
Figure 10:
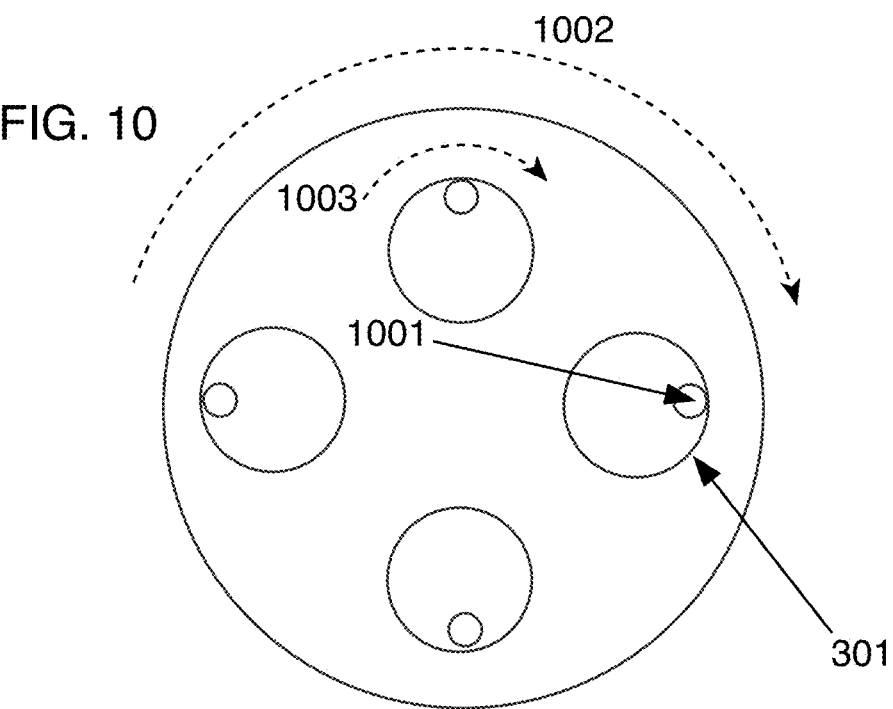
FIG. 10 is a simplified top plan view of the rotating platform and drums of a disclosed centrifuge.
Figure 11:
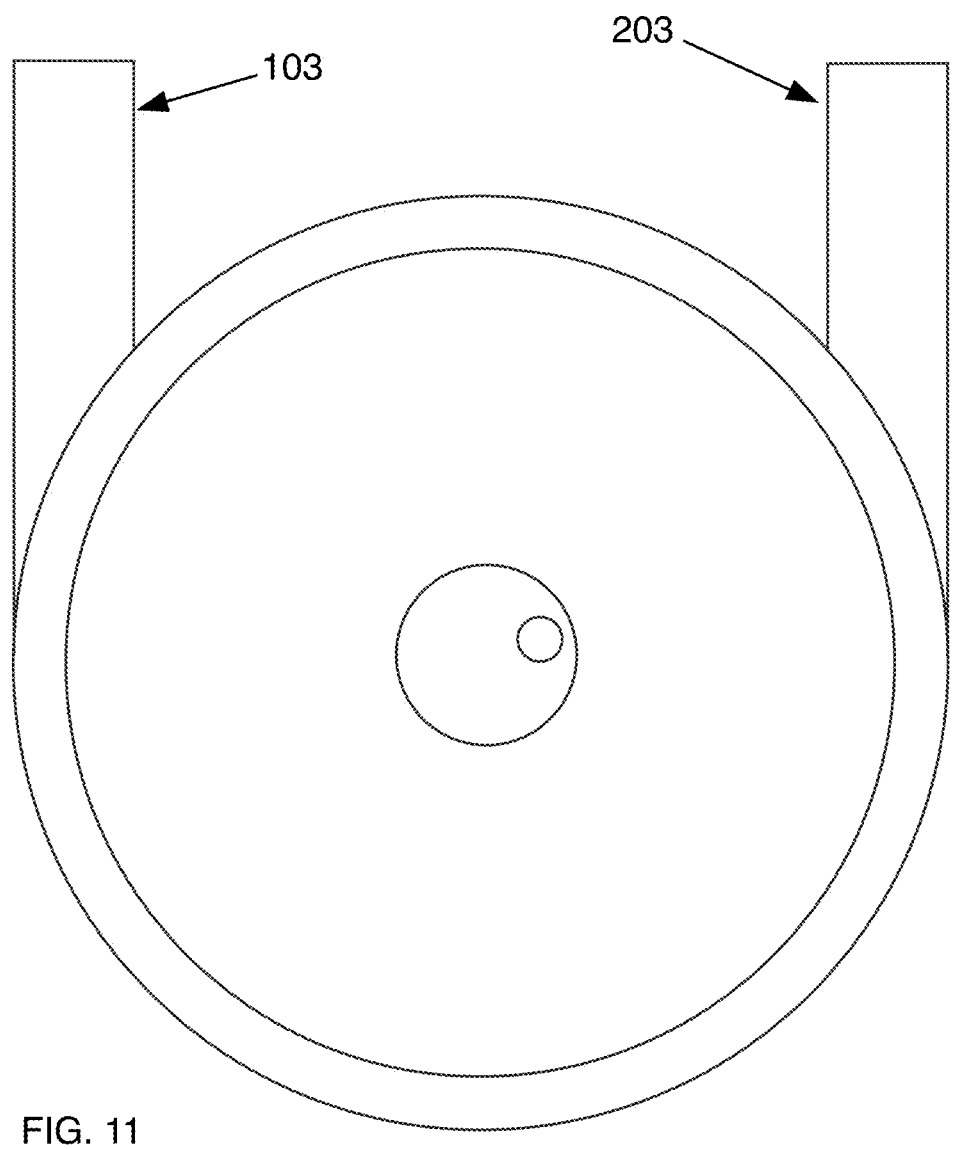
FIG. 11 is a simplified top plan of the disclosed centrifuge showing the liquid egress and the solid egress.

The following description and referenced drawings illustrate embodiments of the application's subject matter. They are not intended to limit the scope. Those familiar with the art will recognize that other embodiments of the disclosed method are possible. All such alternative embodiments should be considered within the scope of the application's claims. For ease of drafting, and hopefully of reading, certain aspects such as speed, handedness, direction of rotation, and diameter are given, but those are exemplary only and should not be interpreted to limit the scope of the claims. Additionally, "centrifugal force" is used in its common conversational sense to be a force acting on the contents of a rotating drum or well that pushes the contents away from the center of rotation.

Each reference number consists of three digits. The first digit corresponds to the number of the figure in which that reference number is first shown. Reference numbers are not necessarily discussed in the order of their appearance in the figures.

A continuous centrifuge is comprised of a rotor (701), a rotating platform (601), and a central primary axis (702). In most useful embodiments the continuous centrifuge further comprises a motor and a gear box (101) which drives the rotor. Operation of the rotor causes the rotating platform to rotate along said central primary axis. In most preferred embodiments, the continuous centrifuge further comprises a primary gear (703).

A continuous centrifuge further comprises at least one drum (301) having an axis (501) and a drum rotational means (602). Most preferred embodiments of the continuous centrifuge comprise at least two drums equally spaced around the rotating platform. For ease of drafting, a single drum will be described. All drums should be understood to be the same unless otherwise noted.

In most preferred embodiments the drum rotational means is a secondary gear (704) and one rotation of the drum rotational means causes one rotation of the drum. Said primary gear and said secondary gear mesh such that when the motor causes the rotating platform, and therefore the drums, to rotate, the drums rotate rate along the central primary axis and the secondary gears turn against the stationary primary gear, ultimately causing the drum to also rotate along the axis of the drum.

In other embodiments belts, chains, or other means may be used instead of gears.

In a most highly preferred embodiment, the ratio of the primary gear to the secondary gear is such that there are two complete rotations of the rotating platform for every single complete rotation of the drum.

In a preferred embodiment, the rotating platform rotates clockwise and the drum rotates clockwise, although the directions of movement could easily be reversed or both directions of movement could be different from each other.

A drum further comprises a top portion (401), a bottom portion (402), a top (403), a bottom (404), an inner surface (405), an outer surface (406), an open top (407), and an inside (502). Said bottom portion comprises an opening (408) through which material in the inside of the drum can be expelled. The top portion comprises perforations (409) which are large enough to allow water and similar liquids to flow through the drum.

The inside of a drum further comprises a downward movement means (410). In a most preferred embodiment the downward movement means is auger fighting (901), although such downward movement means could also be threads running along the inner surface of the drum.

In use, the action of the rotating platform causes material (902) in the drum to be pressed against the inner surface of the drum at the point (1001) furthest from the axis of the rotating platform. However, as the drum is also rotating along the drum axis, the position of the material is not fixed against a set point on the inner surface of the drum, but rolls along the inner surface of the drum, maintaining position at the point inside the drum furthest from the axis of the rotating platform. Additionally, the downward movement means, such as auger fighting or internal threading, causes the material moving against the inner surface of the drum to follow a path toward the bottom of the drum. For example, from above if the rotating platform is moving clockwise (1002) and the drum is also rotating clockwise (1003), then left-handed flighting (901) would force the material to the bottom of the drum.

A continuous centrifuge further comprises a housing (102), a mixture injection means (302), a liquid trough (202), a solid trough (706), a liquid egress (203), a solid egress (103), and at least one solid material mover structure (707). Said housing comprises an inside (303) an outside (104), and a lid (105). Said liquid trough being positioned above said solid trough. The liquid trough slants downward towards the liquid egress.

Some embodiments of the continuous centrifuge further comprise a cleaning solution inlet (201) and one or more air jets (801).

A drum is positioned in the constant centrifuge so that the top portion (401) of the drum is located above the liquid trough (202) and the bottom portion (402) of the drum is located below the liquid trough.

In use, the motor of the continuous centrifuge is operating and both the rotating platform and the drum rotational means are rotating as described before a mixture of liquid and solids, exemplified by wet chicken skin, is injected into the drum via the mixture injection means. Optimally, the material is ejected near the top of the drum to maximize contact with the perforated top of the drum. The two centrifugal force vectors push the mixture to the inner surface of the drum furthest from the axis of the rotating platform and the water fraction of the mixture flows though the perforations of the top portion of the drum and collects in the liquid trough. Due to the slant of the liquid trough, the collected liquid flows toward the liquid egress where it can be reclaimed or discarded. The downward movement means forces the mixture to move towards the bottom of the drum. As the mixture moves, water is continually moving through the perforations so that when the mixture enters the bottom portion of the drum it is a predominately dried bolus. This bolus continues to move down the drum until it reaches the opening of the drum and the centrifugal force causes the bolus to be ejected out of the drum and into the solid trough. In a most preferred embodiment each drum is positioned within the continuous centrifuge such that each opening in each bottom portion of each drum is nearest to, and furthest from, the axis of the rotating platform at the same points during operation of the continuous centrifuge. Ejected dried, solid boli are removed from the continuous centrifuge. In most embodiments, the continuous centrifuge further comprises a solid movement means. In a most preferred embodiment, the solid movement means is a scraper that rotates with the rotor and keeps the ejected solid boli moving in the solid trough until it reaches the solid egress.

The mixture of liquid and solids can be continually injected into a drum, separated into two fractions, and each fraction separately harvested. The injection rate is determined by the user and may be adjusted as necessary. Unlike other centrifuge separation devices, the disclosed continuous centrifuge does not need to be stopped to have the solid fraction removed, saving the user a substantial amount of time and effort. The continuous centrifuge is also largely self-cleaning. In other centrifuge systems with porous drums, the pores may become blocked with bits of solid material. However, due to the rotation of the drum in combination with the rotation of the rotating platform, the solid material is kept moving along the wall of the drum and towards the opening in the bottom portion of the drum, largely preventing solid material from clogging the pores. If collected solid material reaches the point in the drum closest the central primary axis, centrifugal force should cause the bolus to move to the point in the drum furthest from said central primary axis, To ensure the pores of the top portion of the drum remain clear, periodic bursts of air from the air jets (801) may be directed at the outside of the drum, which blow any collected solid material away from the pores, ensuring the continuous centrifuge can operate for long periods without having to be cleaned. If the continuous centrifuge is to be cleaned, as it may be to eliminate bacterial contamination, a cleaning solution can be sprayed in the inside of the housing via the cleaning solution inlet (201).

The forces generated by the rotations of the continuous centrifuge can be changed by altering the rotation speed or by changing the diameter of the drum and the distance from the axis of the drum to the axis of the rotating platform. For separation of chicken skin from water, the inventors have noted that drums 18 inches in diameter and with 21 inches between the drum axis and the axis of the rotating platform provides good results.

We claim:

1. A centrifuge comprising a rotor, a rotating platform comprising a plurality of drum openings, and a plurality of drums in which
   (a) said rotating platform has a central primary axis,
   (b) each said drum has a central axis of rotation,
   (c) each said drum opening houses a drum,
   (d) the rotor is connected to the rotating platform such that operation of the rotor causes the rotating platform to rotate on the central primary axis, and
   (e) each drum rotates on the axis of rotation of the drum when said rotating platform rotates on the central primary axis,
   (f) each said drum comprises an inside, an inside surface, an outside surface, a top portion, and a bottom portion,
   (g) said inner surface comprises a downward movement means,
   (h) said top portion comprising perforations that allow passage of liquids such as water from the inside of the drum to the outside of the drum,
   (i) said top portion comprises an inlet, and
   (j) said bottom portion comprises an egress.

2. The centrifuge of claim 1 in which said downward movement means is auger flighting.

3. A centrifuge comprising a housing, a rotor, a rotating platform comprising a plurality of drum openings, and a plurality of drums in which
   (a) said rotating platform has a central primary axis,
   (b) said rotating platform is largely planar,
   (c) each said drum has a central axis of rotation,
   (d) each said drum opening houses a drum,
   (e) the rotor is connected to the rotating platform such that operation of the rotor causes the rotating platform to rotate on the central primary axis, and
   (f) the rotating platform is in communication with each said drum such that each drum turns on the axis of rotation of the drum when said rotating platform rotates on the central primary axis,
   (g) each said drum comprises an inside, an inside surface, an outside surface, a top portion, and a bottom portion,
   (h) said inner surface comprises a downward movement means,
   (i) said top portion comprises perforations that allow passage of liquids such as water from the inside of the drum to the outside of the drum,
   (j) said top portion comprises an inlet,
   (k) said bottom portion comprises an egress,
   (l) Said housing comprising an inside top space and an inside bottom space separated by said rotating platform,
      i) said inside top space comprises a liquid trough and a liquid egress port,
         a) said liquid trough comprises a slant and a nadir terminating at the liquid egress port,
      ii) said inside bottom space comprises a solid trough, a scraper, and a solid egress port, said scraper causing solids ejected through the solid egress port to move in the solid trough to the solid egress port,
   (m) the top portion of each drum is above the level of the liquid trough, and
   (n) the egress of the bottom portion of each drum is below the level of the liquid trough.

4. The centrifuge of claim 3 further comprising a cleaning solution inlet, a mixture injection means, a compressed air means, and a plurality of air jets,
   (a) said cleaning solution inlet comprising a channel though which cleaning solution can be injected into the continuous centrifuge,
   (b) said mixture injection means comprising a channel through which mixtures of solid and liquid materials can move from outside the continuous centrifuge to inside each of the drums,
   (c) said compressed air means emitting periodic bursts of air through said air jets pointed at the outside surface of a drum.

* * * * *